United States Patent
Liu

(10) Patent No.: US 11,983,397 B2
(45) Date of Patent: May 14, 2024

(54) SLIDING IMAGE CONTAINER SWITCHING DISPLAY METHOD, DEVICE, AND STORAGE MEDIUM

(71) Applicant: BOE TECHNOLOGY GROUP CO., LTD., Beijing (CN)

(72) Inventor: Heng Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 17/379,174

(22) Filed: Jul. 19, 2021

(65) Prior Publication Data

US 2022/0027032 A1    Jan. 27, 2022

(30) Foreign Application Priority Data

Jul. 24, 2020 (CN) .......................... 202010723888.7

(51) Int. Cl.
| | |
|---|---|
| *G06F 3/0485* | (2022.01) |
| *G06F 3/0481* | (2022.01) |
| *G06F 9/451* | (2018.01) |
| *G06F 16/51* | (2019.01) |
| *G06F 16/54* | (2019.01) |

(52) U.S. Cl.
CPC .......... *G06F 3/0485* (2013.01); *G06F 3/0481* (2013.01); *G06F 9/451* (2018.02); *G06F 16/51* (2019.01); *G06F 16/54* (2019.01)

(58) Field of Classification Search
CPC ...... G06F 3/0485; G06F 3/0481; G06F 9/451; G06F 16/51; G06F 16/54; G06F 2203/04803; G06F 3/0656; G06F 13/1673; G09G 5/03; G09G 5/36
See application file for complete search history.

(56) References Cited

U.S. PATENT DOCUMENTS

| | | | | |
|---|---|---|---|---|
| 6,157,395 | A | * | 12/2000 | Alcorn .................. G06T 15/005 345/506 |
| 6,469,717 | B1 | * | 10/2002 | Wineke ............... G06F 3/04845 715/788 |
| 2003/0227460 | A1 | * | 12/2003 | Schinnerer ............. G09G 5/363 345/539 |
| 2005/0010876 | A1 | * | 1/2005 | Robertson ........... G06F 3/04815 715/781 |

(Continued)

FOREIGN PATENT DOCUMENTS

| | | |
|---|---|---|
| CN | 105512170 | 4/2016 |
| CN | 106020780 | 10/2016 |

(Continued)

OTHER PUBLICATIONS

Chinese First Office Action (w/ English translation) for corresponding CN Application No. 202010723888.7, 24 pages.

*Primary Examiner* — Daniel W Parcher
(74) *Attorney, Agent, or Firm* — Dority & Manning, P.A.

(57) ABSTRACT

An image display method includes: displaying, on a user interface, a first image loaded into a first image container in a sliding container; adding a second image container to the sliding container in response to an image switching instruction; loading a second image into the second image container, and the second image being an image located behind the first image in a queue of images to be played; and displaying the second image on the user interface.

11 Claims, 3 Drawing Sheets

(56) References Cited

U.S. PATENT DOCUMENTS

| | | | | |
|---|---|---|---|---|
| 2009/0172532 | A1* | 7/2009 | Chaudhri | G06F 16/444 |
| | | | | 715/702 |
| 2014/0046767 | A1* | 2/2014 | Klanjsek | G06Q 30/02 |
| | | | | 705/14.64 |
| 2014/0244697 | A1* | 8/2014 | Li | G06F 16/168 |
| | | | | 707/821 |
| 2014/0337321 | A1* | 11/2014 | Coyote | G06F 3/04842 |
| | | | | 707/722 |
| 2015/0163536 | A1* | 6/2015 | Han | G06F 9/451 |
| | | | | 725/45 |
| 2015/0242875 | A1* | 8/2015 | Stachowski | G06Q 30/0214 |
| | | | | 715/201 |
| 2021/0034225 | A1* | 2/2021 | Harazi | G06F 3/04845 |

FOREIGN PATENT DOCUMENTS

| | | |
|---|---|---|
| CN | 106686437 | 5/2017 |
| CN | 107341018 | 11/2017 |
| CN | 109218799 | 1/2019 |
| CN | 109298903 | 2/2019 |
| CN | 110134486 | 8/2019 |
| CN | 110716684 | 1/2020 |
| CN | 110806910 | 2/2020 |

\* cited by examiner

SLIDING IMAGE CONTAINER SWITCHING DISPLAY METHOD, DEVICE, AND STORAGE MEDIUM

CROSS-REFERENCE TO RELATED APPLICATION

This application claims priority to Chinese Patent Application No. 202010723888.7, filed on Jul. 24, 2020, which is incorporated herein by reference in its entirety.

TECHNICAL FIELD

The present disclosure relates to the field of image processing technologies, and in particular, to an image display method, a device and a storage medium.

BACKGROUND

At present, electronic devices may display images through ImageViews (also known as image containers). In the process of playing multiple images by the electronic device, the electronic device may preload all the images to be played into multiple ImageViews, and then the electronic device may display the images to be played one by one.

SUMMARY

In a first aspect, some embodiments of the present disclosure provide an image display method, including: displaying, on a user interface, a first image loaded into a first image container in a sliding container; adding a second image container to the sliding container in response to an image switching instruction; loading a second image into the second image container, and the second image being an image located behind the first image in a queue of images to be played; and displaying the second image on the user interface.

In some embodiments, the displaying the second image on the user interface includes: displaying the second image on the user interface through the first image container. After loading the second image into the second image container, and before displaying the second image on the user interface through the first image container, the method further includes: displaying the second image on the user interface through the second image container; loading the second image into the first image container; and switching a display position of the second image container and a display position of the first image container.

In some embodiments, the loading the second image into the first image container includes: obtaining address information of the second image; and loading the second image into the first image container according to the address information.

In some embodiments, the loading the second image into the first image container according to the address information includes: determining a storage position of the second image according to an index of the address information; and loading the second image stored at the storage position into the first image container.

In some embodiments, after displaying the second image on the user interface through the first image container, the method further includes: deleting the second image container from the sliding container.

In some embodiments, the displaying the second image on the user interface includes: displaying the second image on the user interface through the second image container.

In some embodiments of the present disclosure, after displaying the second image on the user interface through the second image container, the method further includes: deleting the first image container from the sliding container.

In some embodiments, the adding the second image container to the sliding container in response to the image switching instruction includes: adding the second image container in a second direction of the first image container in the sliding container, according to a first direction indicated by the image switching instruction, in response to the image switching instruction, and the second direction being opposite to the first direction.

In some embodiments, before adding the second image container to the sliding container in response to the image switching instruction, the method further includes: detecting whether a user's image switching operation is received; and generating the image switching instruction according to an image switching direction indicated by the image switching operation, in response to detecting the image switching operation.

In some embodiments, after displaying the first image container on the user interface, and before adding the second image container to the sliding container in response to the image switching instruction, the method further includes: determining whether a display duration of the first image is greater than or equal to a preset threshold; and generating the image switching instruction according to a preset image switching direction, in response to determining that the display duration of the first image is greater than or equal to the preset threshold.

In a second aspect, some embodiments of the present disclosure provide an electronic device, including: a display screen configured to display, on a user interface, a first image loaded into a first image container in a sliding container; and a processor configured to add a second image container to the sliding container in response to an image switching instruction, and further configured to load a second image into the second image container, and the second image being an image located behind the first image in a queue of images to be played; and the display screen is further configured to display the second image on the user interface.

In some embodiments, the processor is further configured to: control the display screen to display, on the user interface, the second image loaded into the second image container after the second image is loaded into the second image container; load the second image into the first image container; switch a display position of the second image container and a display position of the first image container; and control the display screen to display, on the user interface, the second image loaded into the first image container.

In some embodiments, the processor is configured to obtain address information of the second image; and the processor being configured to load the second image into the first image container includes: the processor being configured to load the second image into the first image container according to the address information.

In some embodiments, the processor being configured to load the second image into the first image container according to the address information includes: the processor being configured to determine a storage position of the second image according to an index of the address information; and to load the second image stored at the storage position into the first image container.

In some embodiments, the processor is further configured to delete the second image container from the sliding container after the second image is displayed on the user interface through the first image container.

In some embodiments, the processor is further configured to control the display screen to display, on the user interface, the second image loaded into the second image container.

In some embodiments, the processor being configured to add the second image container to the sliding container in response to the image switching instruction includes: the processor being configured to add the second image container in a second direction of the first image container in the sliding container, according to a first direction indicated by the image switching instruction, in response to the image switching instruction, and the second direction being opposite to the first direction.

In some embodiments, the processor is further configured to, detect whether a user's image switching operation is received before the second image container is added to the sliding container in response to the image switching instruction; and generate the image switching instruction according to an image switching direction indicated by the image switching operation, in response to detecting the image switching operation.

In some embodiments, the processor is further configured to determine whether a display duration of the first image is greater than or equal to a preset threshold after the first image is displayed on the user interface, and before the second image container is added to the sliding container in response to the image switching instruction; and to generate the image switching instruction according to a preset image switching direction, in response to determining that the display duration of the first image is greater than or equal to the preset threshold.

In a third aspect, some embodiments of the present disclosure provide a non-transitory computer-readable storage medium, and the non-transitory computer-readable storage medium stores computer instructions that are used to cause an electronic device to perform any of the above image display methods.

BRIEF DESCRIPTION OF THE DRAWINGS

In order to describe technical solutions in embodiments of the present disclosure or prior art more clearly, accompanying drawings to be used in the embodiments or the prior art will be briefly introduced below. Obviously, the accompanying drawings to be described below are merely some embodiments of the present disclosure, and a person of ordinary skill in the art may obtain other drawings according to these drawings.

DETAILED DESCRIPTION

In order to make the purposes, technical solutions, and advantages of the present disclosure clearer, the present disclosure will be further explained in detail below in combination with specific embodiments and with reference to the accompanying drawings.

It will be noted that unless defined otherwise, technical or scientific terms used in the embodiments of the present disclosure shall have the ordinary meaning as understood by one of ordinary skill in the art to which the present disclosure belongs. The "first", "second" and similar words used in the present disclosure do not indicate any order, quantity or importance, but are only used to distinguish different components.

Some embodiments may be described using the expression "connected" along with its derivatives. For example, the term "connected" may be used when describing some embodiments to indicate that two or more components are in direct physical contact or electrical contact with each other. The term "connected", however, may also mean that two or more components are not in direct contact with each other, but yet still cooperate or interact with each other. The embodiments disclosed herein are not necessarily limited to the content herein.

"A and/or B" includes the following three combinations: only A, only B, and a combination of A and B.

As used herein, the term "if" is optionally construed as "when" or "in a case where" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The use of "configured to" herein is meant as open and inclusive language that does not foreclose devices adapted to or configured to perform additional tasks or steps.

Figure 1:
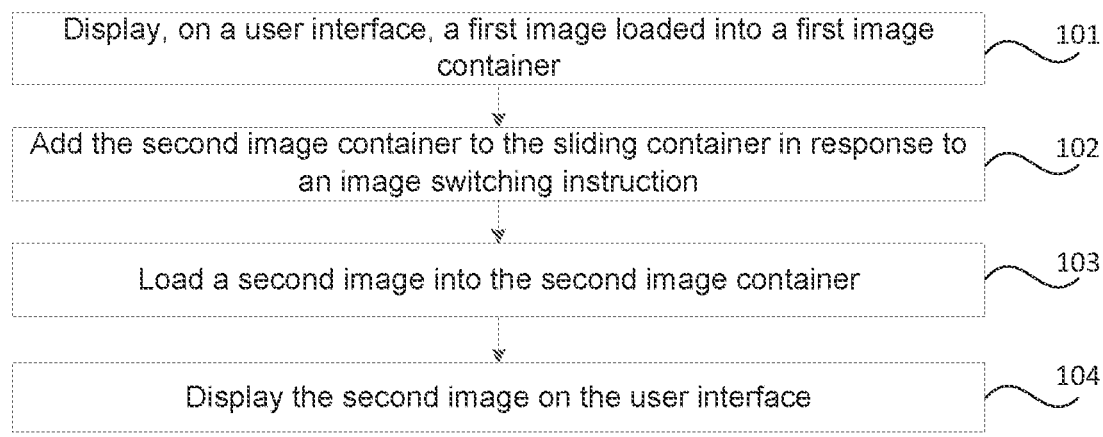
FIG. 1 is a flow diagram of an image display method, in accordance with some embodiments.

FIG. 1 is a flow diagram of an image display method, in accordance with one or more embodiments of the present disclosure. The image display method may be performed by an electronic device.

It will be noted that the electronic device herein may be any device that displays images whether in motion (e.g., a video) or stationary (e.g., a static image), and whether literal or graphical. More precisely, it is anticipated that the described embodiments may be implemented in or associated with a plurality of electronic devices, and the plurality of electronic devices may be, for example (but not limited to), mobile phones, wireless devices, personal data assistants (PDAs), hand-held or portable computers, global positioning system (GPS) receivers/navigators, cameras, Motion Picture Experts Group 4 (MP4) video players, video cameras, game consoles, watches, clocks, calculators, television monitors, flat panel displays, computer monitors, car displays (such as an odometer display), navigators, cockpit controls and/or displays, camera-view displays (such as a display of a rear-view camera in a vehicle), electronic photos, electronic billboards or signs, projectors, architectural structures, packaging and aesthetic structures (such as a display for an image of a piece of jewelry).

The electronic device may be installed with an image browser, so that the electronic device may play images through the image browser. In addition, the electronic device may include a display screen (also referred to as a display) for displaying images, so that the electronic device may display, through the display screen, the image played through the image browser.

In some embodiments, as shown in FIG. 1, the image display method may include steps 101 to 104.

In step 101, a first image loaded into a first image container in a sliding container is displayed on a user interface.

In some embodiments, the sliding container may be used to switch views displayed on the user interface, that is, the electronic device may realize an effect of multi-page switching through the sliding container.

For example, the sliding container may be a view paging tool (such as ViewPager). The electronic device may add a plurality of image containers (i.e., ImageViews) to the ViewPager by creating an adapter. The electronic device may load different images into different image containers. In this way, in a case where the electronic device detects the user's left or right sliding input on the display screen of the electronic device, the electronic device may switch image containers through the ViewPager, so that the image displayed on the display screen may be switched, that is, the image displayed on the user interface (UI) may be switched.

In some examples, the view paging tool may be a view paging tool provided by a system of the electronic device, and may also be a view paging tool set or created in the electronic device by the electronic device according to a received user operation, which may be specifically determined according to actual use requirements, and not limited by the embodiments of the present disclosure.

It will be noted that the image containers (e.g., the first image container and a second image container) involved in the embodiments of the present disclosure may all be ImageViews. The ImageView may be a basic control in the user interface, that is, the ImageView is a control used to display images or views. For example, in a case where an image (e.g., the first image) is displayed on the user interface through the first image container, the first image container may be used as a display container to display an image loaded into the first image container. In this case, the first image container may be used as a display home page, so that the user may interact with the electronic device on the first image container. For example, the user may trigger switching, by the electronic device, of the image displayed on the user interface through a sliding operation on the display screen of the electronic device.

In step 102, the second image container is added to the sliding container in response to an image switching instruction.

In some embodiments, after the electronic device detects the image switching instruction, the electronic device may add the second image container to the sliding container in response to the image switching instruction, so that image to be displayed (e.g., a second image) may be loaded into the second image container.

In some embodiments, the image switching instruction may be an image switching instruction generated by the electronic device according to the received user's sliding operation on the display screen of the electronic device; and may also be an image switching instruction generated by the electronic device when the electronic device is in an image automatic-playing mode, which may be specifically determined according to actual use requirements, and not limited by the embodiments of the present disclosure.

It will be noted that in order to ensure the readability of the embodiments of the present disclosure, a way of generating the image switching instruction will be described in detail in following embodiments, which will not be repeated here.

In some embodiments, the step 102 may include step 102*a*.

In step 102*a*, in response to the image switching instruction, according to a first direction indicated by the image switching instruction, the second image container is added in a second direction of the first image container in the sliding container.

The second direction is opposite to the first direction.

In some examples, the first direction may be a direction of image switching, and may also be an input direction (e.g., a direction of the user's sliding input on the user interface) in which the user triggers generation, by the electronic device, of the image switching instruction, which may be specifically determined according to actual use requirements, and not limited by the embodiments of the present disclosure.

Figure 2:
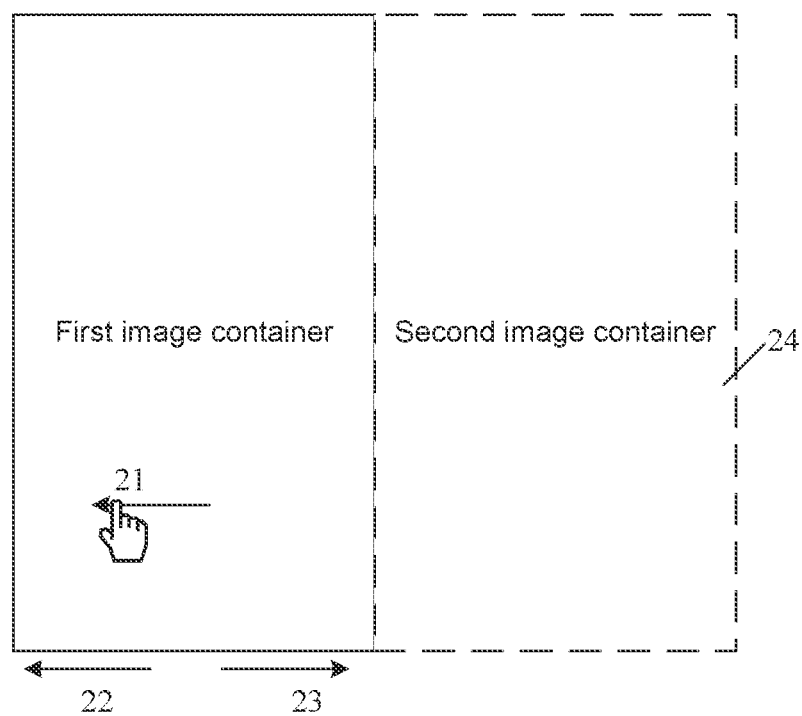
FIG. 2 is a schematic diagram of application of an image display method, in accordance with some embodiments.

For example, the first direction indicates the direction of the user's sliding input on the user interface. Then, as shown in FIG. 2, when the user inputs a leftward sliding input 21 on the user interface, the electronic device may determine that a first direction 22 is a direction toward a left side of the first image container, so that the electronic device may determine that a second direction 23 is a direction toward a right side of the first image container. In this way, the electronic device may add a second image container 24 to the right side of the first image container in the sliding container.

In step 103, a second image is loaded into the second image container.

The second image may be an image located behind the first image in a queue of images to be played.

In step 104, the second image is displayed on the user interface.

In some embodiments, after the electronic device adds the second image container to the sliding container, the electronic device may load, into the second image container, an image (i.e., the second image) located behind the first image in the queue of images to be played, and then the electronic device may display the second image on the user interface.

In the image display method provided by the embodiments of the present disclosure, since in a process of playing images by the electronic device, the electronic device may add the second image container to the sliding container according to the image switching instruction, and load the image located behind the first image in the queue of images to be played into the second image container, so that the second image is displayed on the user interface, and the electronic device may only add image container when switching images. With this solution, it may avoid a case that too many image containers are added to the sliding container, resulting in too much memory of the electronic device occupied by the sliding container, that is, memory of the electronic device occupied by the sliding container may be saved. In addition, it may also avoid a case that a plurality of images are preloaded into the image container in the sliding container, thereby further saving the memory of the electronic device occupied by the sliding container.

In some embodiments, implementation manners in which the electronic device displays the second image on the user interface may include two possible implementation manners, which are following implementation manner 1 and implementation manner 2, respectively. The two possible implementation manners are exemplarily described below.

In implementation manner 1, the electronic device displays the second image on the user interface through the first image container.

Regarding the above implementation manner 1, after the electronic device loads the second image into the second image container, and before the electronic device displays the second image on the user interface through the first image container, the electronic device may first display the second image through the second image container, and then load the second image into the first image container. After the second image is loaded into the first image container, the electronic device may switch a display position of the first image container and a display position of the second image container, so that the first image container is displayed on the user interface. In this way, seamless switching of images may be realized on the user interface, thereby avoiding a problem of screen flickering caused when the images are switched.

Based on this, in some embodiments, the above step 104 may include step 104*a*. Moreover, after the above step 103 and before the step 104*a*, the image display method may further include steps 105 to 107.

In step 105, the second image is displayed on the user interface through the second image container.

In step 106, the second image is loaded into the first image container.

In step 107, the display position of the second image container and the display position of the first image container are switched.

In step 104*a*, the second image on the user interface is displayed through the first image container.

It will be understood that after the electronic device loads the second image into the second image container, the electronic device may first display the second image on the user interface through the second image container to realize images switching (i.e., switching from the first image to the second image). Then the electronic device may load, in the background, the second image into the first image container. After the second image is loaded into the first image container, the electronic device may switch the display position of the first image container and the display position of the second image container, so that the first image container may be used as a display container to display the current displayed image (i.e., the second image). That is, the second image on the user interface is displayed through the first image container. Based on a principle of persistence of vision of human eyes, the user may not perceive a change in images displayed on the user interface, so that seamless switching of images may be realized.

It will be noted that in some embodiments, an image container in which an image displayed on the user interface is located may be referred to as a display container, and an image container in which an image not displayed on the user interface is located may be referred to as an auxiliary container (or a transitional container). In addition, when the electronic device switches image containers or images displayed on the user interface, the sliding container may be in an active state. After the electronic device switches to an image to be displayed and stops switching the image containers, the sliding container may enter an inactive state.

In some embodiments, the above step 106 may include steps 106*a* and 106*b*.

In step 106*a*, address information of the second image is obtained.

In step 106*b*, the second image is loaded into the first image container according to the address information.

The address information of the second image is a storage position of the second image.

In some examples, before the electronic device plays images, a storage position (i.e., address information) of each image in a list of images to be played may be pre-stored (or recorded) in the electronic device. Then, in the process of playing the images by the electronic device, the electronic device may find a storage position of the image to be displayed (e.g., the second image) from pre-stored storage positions, so as to obtain address information of the image to be displayed.

In some examples, the electronic device may obtain an index of the address information of the second image (which may also be referred to as an index of the storage position).

Based on this, in some examples, the above step 106*b* may include steps 106*b*1 and 106*b*2.

In step 106*b*1, the storage position of the second image is determined according to the index of the address information of the second image.

In step 106*b*2, the second image stored at the storage position is loaded into the first image container.

In some embodiments, after the electronic device obtains the index of the address information of the second image, the electronic device may determine the storage position of the second image according to the index of the address information of the second image, that is, it may find the second image. Then, the electronic device may load the second image stored at the storage position into the first image container, so as to correctly load the second image into the first image container.

In some embodiments, after the above step 104*a*, the image display method may further include step 108.

In step 108, the second image container is deleted from the sliding container.

It will be understood that after the electronic device displays the second image on the user interface through the first image container, the sliding container may be in the inactive state, that is, both the first image container and the second image container in the sliding container are in the inactive state. In this case, the electronic device may delete an image container (e.g., the second image) other than the image container used to display the image (e.g., the first image container), so that the sliding container includes only one image container. In this way, occupation of system memory of the electronic device by the image containers may be further reduced, that is, the memory occupied by the sliding container in the electronic device may be reduced.

In implementation manner 2, the electronic device displays the second image on the user interface through the second image container.

It will be understood that in the implementation manner 2, after the electronic device loads the second image into the second image container, the electronic device may directly display the second image container on the user interface, thereby displaying the second image on the user interface. In this case, the second image container is used as a display container.

Based on the above implementation manner 2, after the electronic device displays the second image on the user interface through the second image container, the electronic device may delete the first image container from the sliding container, thereby reducing the occupation of the system memory of the electronic device by the image containers.

In some examples, before the above step 102, the image display method may further include following steps 109 and 110.

In step 109, whether a user's image switching operation is received is detected.

In step 110, an image switching instruction is generated according to an image switching direction indicated by the image switching operation, in response to detecting the image switching operation.

If the user's image switching operation is not detected, the electronic device may keep the first image container as a display container.

A direction indicated by the image switching instruction may be determined according to the image switching direction indicated by the first image switching operation.

In some embodiments, the first image switching operation may be a leftward sliding input, a rightward sliding input, an upward sliding input, or a downward sliding input of the user on the display screen of the electronic device; and the first image switching operation may also be an operation of the user selecting to play a next image or a previous image of an image currently displayed (i.e., the first image) on the user interface, which may be specifically determined according to actual use requirements, and not limited by the embodiments of the present disclosure.

In some embodiments, the image switching direction may be determined according to an input direction of the first image switching operation.

Figure 3:
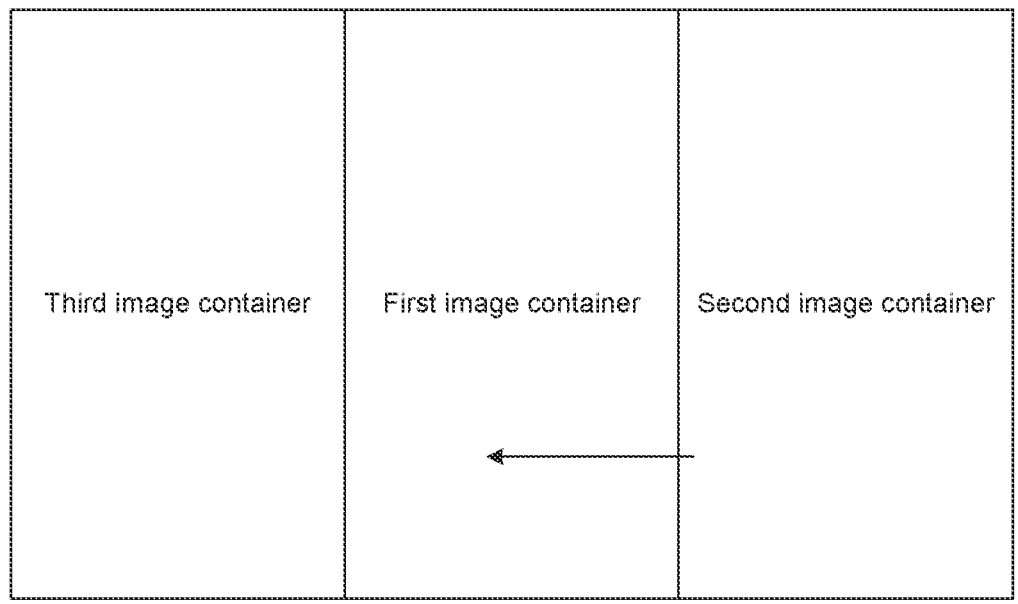
FIG. 3 is a first schematic diagram of image containers, in accordance with some embodiments.

For example, as shown in FIG. 3, assuming that the first image switching operation is a leftward sliding input of the user on the display screen of the electronic device, the electronic device may generate an image switching instruction for switching images to the right, according to the first image switching operation. Therefore, the electronic device may add a temporary image container (i.e., the second image container) to the right side of the first image container.

Accordingly, if the first image switching operation is a rightward sliding input of the user on the display screen of the electronic device, the electronic device may generate an image switching instruction for switching images to the left, according to the first image switching operation. Thus, the electronic device may add a temporary image container to the left side of the first image container.

In some other examples, after the step 101 and before the step 102, the image display method may further include following steps 111 and 112.

In step 111, whether a display duration of the first image is greater than or equal to a preset threshold is determined.

In step 112, an image switching instruction is generated according to a preset image switching direction, in response to determining that the display duration of the first image is greater than or equal to the preset threshold.

If the display duration of the first image container on the user interface is less than the preset threshold, the electronic device may keep displaying the first image on the user interface.

It will be understood that the image switching direction may be pre-stored in the electronic device, so that when the electronic device determines that the display duration of the first image is greater than or equal to the preset threshold, the electronic device may directly generate a deletion image switching instruction according to the image switching direction.

In some examples, the preset threshold may be any possible duration such as 10 seconds, 30 seconds, 1 minute, or 2 minutes, which may be specifically determined according to actual use requirements, and not limited by the embodiments of the present disclosure.

In some embodiments, the preset image switching direction may be determined according to a preset play mode of the electronic device.

In some examples, the preset play mode may be any of following play modes: playing the images in a folder (i.e., the queue of images to be played) in sequence; playing the images in the folder in an order of time when the images are stored; playing the images in the folder according to geographic locations of the captured images; playing the images in the folder according to classification of the images; and playing the images in the folder according to a play order preset by the user.

Of course, in an actual implementation, the preset play mode may also be in any other possible implementation manners, which may be specifically determined according to actual use requirements, and not limited by the embodiments of the present disclosure.

In some embodiments, the image display method further includes: before the first image loaded into the first image container in the sliding container is displayed on the user interface, adding, by the electronic device, the first image container, a second image container in a third direction of the first image container, and a third image container in a fourth direction of the first image container.

Figure 4:
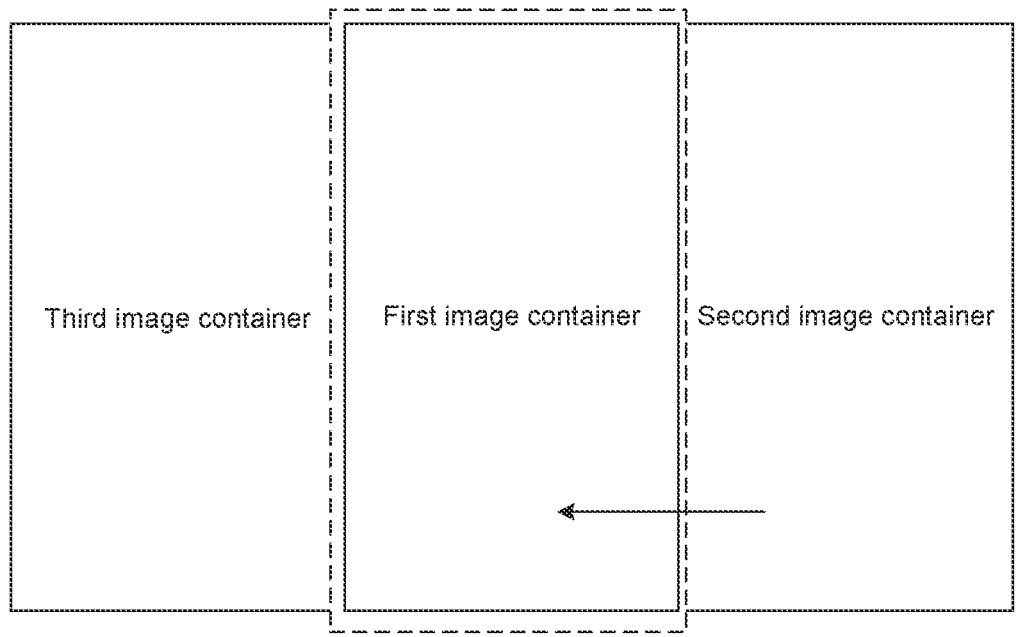
FIG. 4 is a second schematic diagram of image containers, in accordance with some embodiments.

For example, as shown in FIG. 4, the first image container is used as a display container, that is the first image container may be used as the home page (as shown in a dashed box in FIG. 4), so that the electronic device may display the image on the display screen of the electronic device through the first image container. The second image container and the third image container serve as auxiliary containers (may also be referred to as transitional containers). The second image container may be located on the right side of the first image container, and the third image container may be located on the left side of the first image container.

In some examples, the electronic device may load three images to be displayed in the queue of images (or list of images) to be played into the above three containers (i.e., the first image container, the second image container, and the third image container). The electronic device loads the first image to be displayed currently into the first image container, and then the first image loaded into the first image container is displayed on the display screen of the electronic device by using a setCurrentItem(1) method of the sliding container. For example, as shown in FIG. 4, when the electronic device detects the user's leftward sliding input on the display screen (an arrow direction in FIG. 4 is used to indicate the user's sliding direction on the display screen of the electronic device), that is, the electronic device detects the image switching instruction, the electronic device may display the second image loaded into the second image container on the user interface, and then update the image in the first image container to the second image, and then the image displayed on the user interface is switched from the second image loaded into the second image container to the second image loaded into the first image container by using the setCurrentItem(1) method of the sliding container. Because of the principle of persistence of vision, the user will not perceive the change of the image container on the user interface, that is, the user will not perceive that the images displayed on the user interface has changed, so that the image displayed on the user interface may be seamlessly switched, thereby avoiding the problem of screen flickering when the electronic device switches the images.

In some embodiments, after the electronic device switches the display position of the first image container and the display position of the second image container, the electronic device may reload images into the second image container and the third image container according to a preset or default image play order.

Based on the above method, the electronic device may add three image containers to one sliding container in advance, and use one of the image containers as the display container and the other two image containers as the auxiliary containers. When the image switching instruction is detected, an image loaded into an auxiliary container may be displayed on the user interface first, then an image loaded into the display container may be replaced with an image loaded into the auxiliary container, and then the display container may be moved to the user interface, thereby achieving seamless switching of images.

Some embodiments of the present disclosure provide an electronic device, including a memory, a processor, and a computer program stored in the memory and executable on the processor. When executing the program, the processor causes the electronic device to implement any of the above image display methods.

Some embodiments of the present disclosure provide a non-transitory computer-readable storage medium, and the non-transitory computer-readable storage medium stores computer instructions that are used to cause a computer to perform any of the above image display methods.

In some embodiments, the non-transitory computer-readable storage medium includes permanent and non-permanent, removable and non-removable media, and may realize storage of information through any method or technology. The information may be computer-readable instructions, data structures, program modules, or other data, and the information may be accessed by a computing device.

For example, the non-transitory computer-readable storage medium may include, but is not limited to: a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic-box-type magnetic tape, a magnetic tape or magnetic disk storage or another magnetic storage device or any other non-transmission medium.

Figure 5:
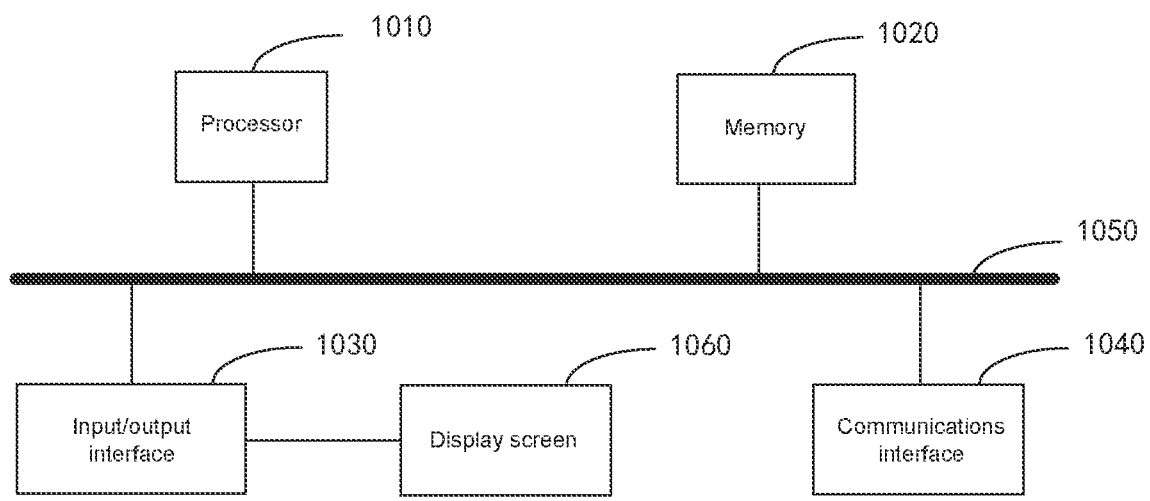
FIG. 5 is a structural diagram of an electronic device, in accordance with some embodiments.

As shown in FIG. 5, some embodiments of the present disclosure provide an electronic device. The electronic device may include a processor 1010, a memory 1020, an input/output interface 1030, a communications interface 1040, and a bus 1050. The processor 1010, the memory 1020, the input/output interface 1030, and the communications interface 1040 realize communications connections between each other inside the device via the bus 1050.

The processor 1010 may be implemented by a general-purpose central processing unit (CPU), a microprocessor, an application specific integrated circuit (ASIC), or one or more integrated circuits, and is used to execute related programs to realize the technical solutions provided by the embodiments of the present specification.

The memory 1020 may be implemented in a form of the ROM, the RAM, static storage device, dynamic storage device, etc. The memory 1020 may store an operating system and other application programs. When the technical solutions provided by the embodiments of the present specification are implemented by software or firmware, related program codes are stored in the memory 1020 and called and executed by the processor 1010.

The input/output interface 1030 is used to connect input/output devices to realize input and output of information. Input/output modules (or devices) may be configured in the device as components, or may be external to the device to provide corresponding functions. An input device may include a keyboard, a mouse, a touch screen, a microphone, and various sensors, and an output device may include a display screen (also referred to as a display) 1060, a speaker, a vibrator, and an indicator light.

The communications interface 1040 is used to connect communications modules to realize communications interaction between the device and other devices. The communications module may realize communications by wire (e.g., USB and network cable), or in a wireless mode (e.g., mobile network, WIFI, and Bluetooth).

The bus 1050 includes a path to transmit information among various components of the device (e.g., the processor 1010, the memory 1020, the input/output interface 1030, and the communications interface 1040).

In some embodiments, the display screen is configured to display, on a user interface, a first image loaded into a first image container in a sliding container. The processor is configured to add a second image container to the sliding container in response to an image switching instruction, and further configured to load a second image into the second image container, and the second image is an image located behind the first image in a queue of images to be played. The display screen is further configured to display the second image on the user interface.

In some embodiments, the processor is further configured to: control the display screen to display, on the user interface, the first image loaded into the first image container.

In some embodiments, the processor is further configured to: control the display screen to display, on the user interface, the second image loaded into the second image container after the second image is loaded into the second image container; load the second image into the first image container; switch a display position of the second image container and a display position of the first image container; and control the display screen to display, on the user interface, the second image loaded into the first image container.

In some embodiments, the processor is configured to obtain address information of the second image; and the processor being configured to load the second image into the first image container includes: the processor being configured to load the second image into the first image container according to the address information.

In some embodiments, the processor being configured to load the second image into the first image container according to the address information includes: the processor being configured to determine a storage position of the second image according to an index of the address information; and to load the second image stored at the storage position into the first image container.

In some embodiments, the processor is further configured to delete the second image container from the sliding container after the second image is displayed on the user interface through the first image container.

In some embodiments, the processor is further configured to control the display screen to display, on the user interface, the second image loaded into the second image container.

In some embodiments, the processor is further configured to delete the first image container from the sliding container after the second image is displayed on the user interface through the second image container.

In some embodiments, the processor being configured to add the second image container to the sliding container in response to the image switching instruction includes: the processor being configured to add the second image container in a second direction of the first image container in the sliding container, according to a first direction indicated by the image switching instruction, in response to the image switching instruction, and the second direction being opposite to the first direction.

In some embodiments, the processor is further configured to, in response to the image switching instruction, detect whether a user's image switching operation is received before the second image container is added to the sliding container; and generate the image switching instruction according to an image switching direction indicated by the image switching operation, in response to detecting the image switching operation.

In some embodiments, the processor is further configured to determine whether a display duration of the first image is greater than or equal to a preset threshold after the first image is displayed on the user interface, and before the second image container is added to the sliding container in response to the image switching instruction; and generate the image switching instruction according to a preset image switching direction, in response to determining that the display duration of the first image is greater than or equal to the preset threshold.

In the electronic device provided by some embodiments of the present disclosure, in a process of playing images by the electronic device, the electronic device may add the second image container to the sliding container according to the image switching instruction, and load the image located behind the first image in the queue of images to be played into the second image container, so that the second image is displayed on the user interface. Therefore, the electronic device may only add the image containers when switching images. On one hand, it may avoid a case that too many image containers are added to the sliding container, resulting in too much memory of the electronic device occupied by the sliding container, that is, memory of the electronic device occupied by the sliding container may be saved. On another hand, it may also avoid a case that a plurality of images are preloaded into the image container in the sliding container, thereby further saving the memory of the electronic device occupied by the sliding container.

It will be noted that although the above device only shows the processor 1010, the memory 1020, the input/output interface 1030, the communications interface 1040, and the bus 1050, in a specific implementation process, the device may also include other components necessary to implementations of normal operations. In addition, those skilled in the art may understand that the above-mentioned device may also include only the components necessary to implement the solutions of the embodiments of the present specification, and not necessarily include all the components shown in the figures.

The foregoing describes specific embodiments of the description. Other embodiments are within the scope of the appended claims. In some cases, the actions or steps recorded in the claims may be performed in an order different from that in the embodiments, and desired results can still be realized. In addition, processes depicted in the drawings do not necessarily require a specific order or sequential order shown to achieve the desired results. In some embodiments, multitasking and parallel processing are also possible or may be advantageous.

Those of ordinary skill in the art should understand that: the discussion of any of the above embodiments is only exemplary, and is not intended to imply that the scope of the present disclosure (including the claims) is limited to these examples; and under an idea of the present disclosure, the above embodiments or the technical features in different embodiments may also be combined, the steps may be implemented in any order, and there are many other changes in different aspects of the present disclosure as described above, and they are not provided in the details for the sake of brevity.

In addition, in order to simplify the description and discussion, and in order not to make the present disclosure difficult to understand, the provided drawings may or may not show the well-known power supply/ground connections associated with integrated circuit (IC) chips and other components. In addition, the devices may be shown in a form of block diagrams in order to avoid making the present disclosure difficult to understand, and this also takes into account a fact that the details of the implementations of these block diagram devices are highly dependent on a platform on which the present disclosure will be implemented (that is, these details should be fully within a scope of understanding of those skilled in the art). In a case where specific details (e.g., circuits) are expounded to describe exemplary embodiments of the present disclosure, it is obvious to those skilled in the art that the present disclosure may be implemented without these specific details or when these specific details change. Therefore, these descriptions should be considered illustrative rather than restrictive.

Although the present disclosure has been described in combination with specific embodiments of the present disclosure, based on the foregoing description, many substitutions, modifications, and variations of these embodiments will be obvious to those of ordinary skill in the art. For example, other memory architectures (e.g., dynamic RAM (DRAM)) may use the discussed embodiments.

The embodiments of the present disclosure are intended to cover all such substitutions, modifications, and variations that fall within a broad scope of the appended claims. Therefore, any omissions, modifications, equivalent substitutions, improvements, etc. made within the spirit and principle of the present disclosure should be included in the protection scope of the present disclosure.

What is claimed is:

1. An image display method, comprising:
displaying, on a user interface, a first image loaded into a first image container in a sliding container;
adding a second image container to the sliding container only in response to an image switching instruction;
loading a second image into the second image container, and the second image being an image located behind the first image in a queue of images to be played; and
displaying the second image on the user interface,
wherein adding the second image container to the sliding container only in response to the image switching instruction includes:
adding the second image container in a second direction of the first image container in the sliding container, according to a first direction indicated by the image switching instruction, only in response to the image switching instruction, wherein the second direction is opposite to the first direction;
wherein displaying the second image on the user interface includes:
displaying the second image on the user interface through the first image container;
after loading the second image into the second image container, and before displaying the second image on the user interface through the first image container, the method further comprises:
displaying the second image on the user interface through the second image container;
loading the second image into the first image container; and
switching a display position of the second image container and a display position of the first image container; and
in response to displaying the second image on the user interface through the first image container,
the method further comprises:
deleting the second image container from the sliding container; after the second image container is deleted, the sliding container includes only the first image container displaying the second image;

in response to displaying the second image on the user interface through the second image container, the method further comprises:
deleting the first image container from the sliding container; after the first image container is deleted, the sliding container includes only the second image container displaying the second image.

2. The method according to claim 1, wherein loading the second image into the first image container includes:
obtaining address information of the second image; and
loading the second image into the first image container according to the address information.

3. The method according to claim 2, wherein loading the second image into the first image container according to the address information includes:
determining a storage position of the second image according to an index of the address information; and
loading the second image stored at the storage position into the first image container.

4. The method according to claim 1, wherein before adding the second image container to the sliding container only in response to the image switching instruction, the method further comprises:
detecting whether a user's image switching operation is received; and
generating the image switching instruction according to an image switching direction indicated by the image switching operation, in response to detecting the image switching operation.

5. The method according to claim 1, wherein after displaying the first image on the user interface, and before adding the second image container to the sliding container only in response to the image switching instruction, the method further comprises:
determining whether a display duration of the first image is greater than or equal to a preset threshold; and
generating the image switching instruction according to a preset image switching direction, in response to determining that the display duration of the first image is greater than or equal to the preset threshold.

6. An electronic device, comprising:
a display screen configured to display, on a user interface, a first image loaded into a first image container in a sliding container; and
a processor configured to add a second image container to the sliding container only in response to an image switching instruction, and further configured to load a second image into the second image container, wherein the second image is an image located behind the first image in a queue of images to be played; and
the display screen being further configured to display the second image on the user interface, wherein the processor being configured to add the second image container to the sliding container only in response to the image switching instruction includes:
the processor being configured to add the second image container in a second direction of the first image container in the sliding container, according to a first direction indicated by the image switching instruction, only in response to the image switching instruction; wherein the second direction is opposite to the first direction;
wherein the processor is further configured to:
control the display screen to display, on the user interface, the second image loaded into the second image container after the second image is loaded into the second image container;
load the second image into the first image container;
switch a display position of the second image container and a display position of the first image container; and
control the display screen to display, on the user interface, the second image loaded into the first image container; and
the processor is further configured to delete the second image container from the sliding container in response to the second image being displayed on the user interface through the first image container;
after the second image container is deleted, the sliding container includes only the first image container displaying the second image; and
the processor is further configured to delete the first image container from the sliding container in response to the second image being displayed on the user interface through the second image container;
after the first image container is deleted, the sliding container includes only the second image container displaying the second image.

7. The electronic device according to claim 6, wherein the processor is configured to obtain address information of the second image; and
the processor being configured to load the second image into the first image container includes:
the processor being configured to load the second image into the first image container according to the address information.

8. The electronic device according to claim 7, wherein the processor being configured to load the second image into the first image container according to the address information includes:
the processor being configured to determine a storage position of the second image according to an index of the address information, and to load the second image stored at the storage position into the first image container.

9. The electronic device according to claim 6, wherein the processor is further configured to detect whether a user's image switching operation is received before the second image container is added to the sliding container only in response to the image switching instruction; and
generate the image switching instruction according to an image switching direction indicated by the image switching operation, in response to detecting the image switching operation.

10. The electronic device according to claim 6, wherein the processor is further configured to determine whether a display duration of the first image is greater than or equal to a preset threshold after the first image is displayed on the user interface, and before the second image container is added to the sliding container only in response to the image switching instruction; and
generate the image switching instruction according to a preset image switching direction, in response to determining that the display duration of the first image is greater than or equal to the preset threshold.

11. A non-transitory computer-readable storage medium, the non-transitory computer-readable storage medium storing computer instructions that are used to cause an electronic device to perform:
displaying, on a user interface, a first image loaded into a first image container in a sliding container;

adding a second image container to the sliding container only in response to an image switching instruction;

loading a second image into the second image container, and the second image being an image located behind the first image in a queue of images to be played; and displaying the second image on the user interface, wherein adding the second image container to the sliding container only in response to the image switching instruction includes:

adding the second image container in a second direction of the first image container in the sliding container, according to a first direction indicated by the image switching instruction, only in response to the image switching instruction, wherein the second direction is opposite to the first direction;

wherein displaying the second image on the user interface includes:

displaying the second image on the user interface through the first image container; after loading the second image into the second image container, and before displaying the second image on the user interface through the first image container, the computer instructions are further used to cause the electronic device to perform:

displaying the second image on the user interface through the second image container; loading the second image into the first image container; and switching a display position of the second image container and a display position of the first image container; and in response to displaying the second image on the user interface through the first image container, the computer instructions are further used to cause the electronic device to perform:

deleting the second image container from the sliding container; after the second image container is deleted, the sliding container includes only the first image container displaying the second image;

in response to displaying the second image on the user interface through the second image container, the computer instructions are further used to cause the electronic device to perform: deleting the first image container from the sliding container;

after the first image container is deleted, the sliding container includes only the second image container displaying the second image.

\* \* \* \* \*